(12) United States Patent
Pisano

(10) Patent No.: US 11,272,698 B1
(45) Date of Patent: Mar. 15, 2022

(54) FISH HOOK REMOVAL DEVICE

(71) Applicant: Michael J. Pisano, Marco Island, FL (US)

(72) Inventor: Michael J. Pisano, Marco Island, FL (US)

(*) Notice: Subject to any disclaimer, the term of this patent is extended or adjusted under 35 U.S.C. 154(b) by 385 days.

(21) Appl. No.: 16/441,612

(22) Filed: Jun. 14, 2019

(51) Int. Cl.
A01K 97/18 (2006.01)
A01K 83/00 (2006.01)
A01K 91/06 (2006.01)

(52) U.S. Cl.
CPC ............... *A01K 97/18* (2013.01); *A01K 83/00* (2013.01); *A01K 91/06* (2013.01)

(58) Field of Classification Search
CPC ...................................................... A01K 97/18
USPC .......................................... 43/53.5; D22/149
See application file for complete search history.

(56) References Cited

U.S. PATENT DOCUMENTS

| 1,000,775 | A | * | 8/1911 | Buras, Jr. | A01K 97/18 43/53.5 |
| 1,043,627 | A | * | 11/1912 | Risdon | A01K 97/18 43/53.5 |
| 1,208,671 | A | * | 12/1916 | Severtsen et al. | A01K 97/18 43/53.5 |
| 1,629,583 | A | * | 5/1927 | Nelson | A01K 97/18 43/53.5 |
| 1,728,864 | A | * | 9/1929 | Kramer | A01K 97/18 43/53.5 |
| 1,777,695 | A | * | 10/1930 | Jeffery | A01K 97/18 43/53.5 |
| 2,164,907 | A | * | 7/1939 | Falkner | A01K 97/18 43/53.5 |
| 2,215,275 | A | * | 9/1940 | Philips | A01K 97/18 43/53.5 |
| 2,244,270 | A | * | 6/1941 | Verrett | A01K 97/18 43/53.5 |
| 2,289,767 | A | * | 7/1942 | Ford | A01K 97/18 43/53.5 |
| 2,348,662 | A | * | 5/1944 | Stevens | A01K 97/18 43/53.5 |
| 2,491,763 | A | * | 12/1949 | Raisanen | A01K 97/18 43/53.5 |
| 2,492,799 | A | * | 12/1949 | Holland | A01K 97/18 43/53.5 |
| 2,502,793 | A | * | 4/1950 | Kinney | A01K 97/18 43/53.5 |

(Continued)

FOREIGN PATENT DOCUMENTS

| DE | 527742 C | * | 6/1931 | ............. A01K 97/18 |
| DE | 2318691 A1 | * | 11/1974 | ............. A01K 97/18 |

(Continued)

*Primary Examiner* — Darren W Ark
(74) *Attorney, Agent, or Firm* — Bryan L. Loeffler, Esq.; Loeffler IP Group, P.A.

(57) ABSTRACT

A fish hook removal device (1) used for removing fishing hooks (11) from human skin. The fish hook removal device applies downward pressure on a shank (15) of a fishing hook via a forked tip (4) located on a distal end ( ) of a shaft (3) extending from a handle (2). A removal hook (10) extends from the shaft and engages a curve (13) of the fish hook to apply a rearward motion to the curve of the fishing hook. The simultaneous downward pressure and rearward motion aligns a barb (12) of the fishing hook with an entry point of a wound (18) as the barb is removed from the wound.

1 Claim, 2 Drawing Sheets

(56) References Cited

U.S. PATENT DOCUMENTS

| | | | | |
|---|---|---|---|---|
| 2,512,818 | A * | 6/1950 | Wikarski | A01K 97/18 43/53.5 |
| 2,531,522 | A * | 11/1950 | Maloufabraham | B25B 7/16 43/53.5 |
| 2,533,152 | A * | 12/1950 | Svenson | A01K 97/18 43/53.5 |
| 2,537,879 | A * | 1/1951 | Culhane, Jr. | A01K 97/18 43/53.5 |
| 2,561,281 | A * | 7/1951 | Lawrence | A01K 97/18 43/53.5 |
| 2,586,431 | A * | 2/1952 | Krichbaum | A01K 97/18 43/53.5 |
| 2,589,976 | A * | 3/1952 | Steele | A01K 97/18 43/53.5 |
| 2,695,471 | A * | 11/1954 | Imberti | A01K 97/18 43/53.5 |
| 2,736,126 | A * | 2/1956 | Mathews | A01K 97/18 43/53.5 |
| 2,861,383 | A * | 11/1958 | Gray | A01K 97/18 43/53.5 |
| 2,887,817 | A * | 5/1959 | Sharpe | A01K 97/18 43/53.5 |
| 2,892,284 | A * | 6/1959 | Shawhan | A01K 97/18 43/53.5 |
| 2,972,205 | A * | 2/1961 | Wear | A01K 97/18 43/53.5 |
| 3,008,260 | A * | 11/1961 | Landrum | A01K 97/18 43/53.5 |
| 3,013,929 | A * | 12/1961 | Reiling | D03J 3/00 156/579 |
| 3,019,547 | A * | 2/1962 | Felts | A01K 97/18 43/53.5 |
| 3,034,252 | A * | 5/1962 | Baskinski | A01K 97/18 43/53.5 |
| 3,252,724 | A * | 5/1966 | Kearns | A01K 91/04 289/17 |
| D205,664 | S * | 9/1966 | Drake | D22/149 |
| 3,334,437 | A * | 8/1967 | Sawyer | A01K 97/18 43/53.5 |
| 3,555,718 | A * | 1/1971 | Montgomery | A01K 97/18 43/53.5 |
| 3,670,448 | A * | 6/1972 | Wehmeyer | A01K 97/18 43/53.5 |
| 3,713,243 | A * | 1/1973 | Tetzner | A01K 97/18 43/53.5 |
| 3,714,732 | A | 2/1973 | Little | |
| 3,721,034 | A * | 3/1973 | Collins | A01K 97/18 43/53.5 |
| 3,835,574 | A * | 9/1974 | Harwood | A01K 97/18 43/53.5 |
| 4,014,131 | A * | 3/1977 | Bendik | A01K 97/18 43/53.5 |
| 4,206,561 | A * | 6/1980 | Wong | A01K 97/18 43/53.5 |
| 4,342,171 | A * | 8/1982 | Cripps | A01K 97/18 43/53.5 |
| D280,542 | S * | 9/1985 | Hurst | D22/149 |
| D312,295 | S * | 11/1990 | Travis | D22/134 |
| 5,010,680 | A | 4/1991 | Lytle | |
| 5,084,999 | A * | 2/1992 | Henry | A01K 97/18 43/53.5 |
| 5,138,791 | A * | 8/1992 | Coes | A01K 97/18 43/4 |
| 5,307,586 | A * | 5/1994 | Palmer | A01K 97/18 43/4 |
| 5,421,120 | A * | 6/1995 | Brumfield | A01K 97/18 43/53.5 |
| D362,898 | S * | 10/1995 | Krupp | D22/149 |
| 5,475,941 | A * | 12/1995 | Moore | A01K 97/00 29/268 |
| D387,846 | S * | 12/1997 | Brain | D22/149 |
| 5,784,830 | A * | 7/1998 | Brumfield | A01K 97/18 43/53.5 |
| 5,934,009 | A * | 8/1999 | Trahan | A01K 97/18 43/53.5 |
| 6,038,808 | A * | 3/2000 | Bergeron | A01K 97/18 177/245 |
| 6,272,788 | B1 * | 8/2001 | Bergacker | A01K 97/18 43/53.5 |
| 6,526,691 | B1 * | 3/2003 | Maddox | A01K 97/14 43/53.5 |
| 6,584,726 | B2 * | 7/2003 | Dehm | A01K 97/18 43/53.5 |
| D535,719 | S * | 1/2007 | Yeaman | D22/149 |
| 7,434,350 | B1 * | 10/2008 | Gomez, Sr. | A01K 97/18 43/53.5 |
| D877,853 | S * | 3/2020 | Boyette | D22/149 |
| 2003/0029075 | A1 * | 2/2003 | Hebard | A01K 97/18 43/53.5 |
| 2010/0132243 | A1 * | 6/2010 | Dick | A01K 97/18 43/53.5 |
| 2012/0158018 | A1 | 7/2012 | Benedetti | |
| 2019/0350606 | A1 * | 11/2019 | Gearwar | A61B 17/282 |
| 2019/0387731 | A1 * | 12/2019 | Simos | A01K 97/18 |

FOREIGN PATENT DOCUMENTS

| | | | | |
|---|---|---|---|---|
| DE | 3204976 A1 * | 8/1983 | | A01K 97/18 |
| FR | 1520675 A * | 4/1968 | | A01K 97/18 |
| GB | 311624 A * | 5/1929 | | A01K 97/18 |
| GB | 873063 A * | 7/1961 | | A01K 97/18 |
| GB | 2083991 A * | 4/1982 | | A01K 97/18 |
| JP | H0591340 U * | 12/1993 | | |
| JP | H0611474 U * | 2/1994 | | |
| JP | 7013504 Y2 * | 4/1995 | | |
| JP | 07227188 A * | 8/1995 | | |
| JP | 10033102 A * | 2/1998 | | |
| JP | 11032644 A * | 2/1999 | | |
| JP | 11196744 A * | 7/1999 | | |
| JP | 11318304 A * | 11/1999 | | |
| JP | 2000041559 A * | 2/2000 | | |
| JP | 2001045944 A * | 2/2001 | | |
| JP | 2002095400 A * | 4/2002 | | |
| JP | 2002199833 A * | 7/2002 | | |
| JP | 2005185185 A * | 7/2005 | | |
| JP | 2013055931 A * | 3/2013 | | |
| JP | 3182851 U * | 4/2013 | | |
| JP | 2021019501 A * | 2/2021 | | A01K 97/18 |
| WO | WO2005/096812 | 10/2005 | | |

* cited by examiner

FISH HOOK REMOVAL DEVICE

FIELD OF THE INVENTION

This invention relates to the sport of fishing and more particularly a device used for removing a barbed fishing hook from an individual's skin after the fishing hook is accidentally lodged in the skin.

BACKGROUND OF THE INVENTION

Fishing is a common recreational sport wherein barbed fishing hooks are used for their effectiveness in maintaining the fish on the hook once it is caught. However, if a barbed fishing hook is accidentally caught and implanted in the skin of a fisherman, it can be very difficult to remove. If the barb is not properly guided out of the wound, the barb will cause further pain, additional tissue damage and/or an increased risk for infection and other complications.

Therefore, a need exists for a fishing hook removal device that disengages the barb of the fishing hook during the removal process of the fishing hook from an individual's skin, thereby reducing additional tissue damage from occurring and possible other complications associated therewith.

SUMMARY OF THE INVENTION

The primary object of the present invention is to provide a fishing hook removal device that disengages the barb of the fishing hook during the removal process of the fishing hook from an individual's skin, thereby reducing additional tissue damage from occurring and the risk of infection and other complications associated therewith.

The present invention fulfills the above and other objects by providing a hand-held fishing hook removal device for removing a fishing hook from human skin. The fish hook removal device applies downward pressure on a shank of a fishing hook via a forked tip located on a distal end of a shaft extending from a handle. A removal hook extends from the shaft and engages a curve of the fish hook to apply a rearward motion to the curve of the fishing hook. The simultaneous downward pressure and rearward motion aligns the barb with an entry wound as the barb is removed from the wound.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
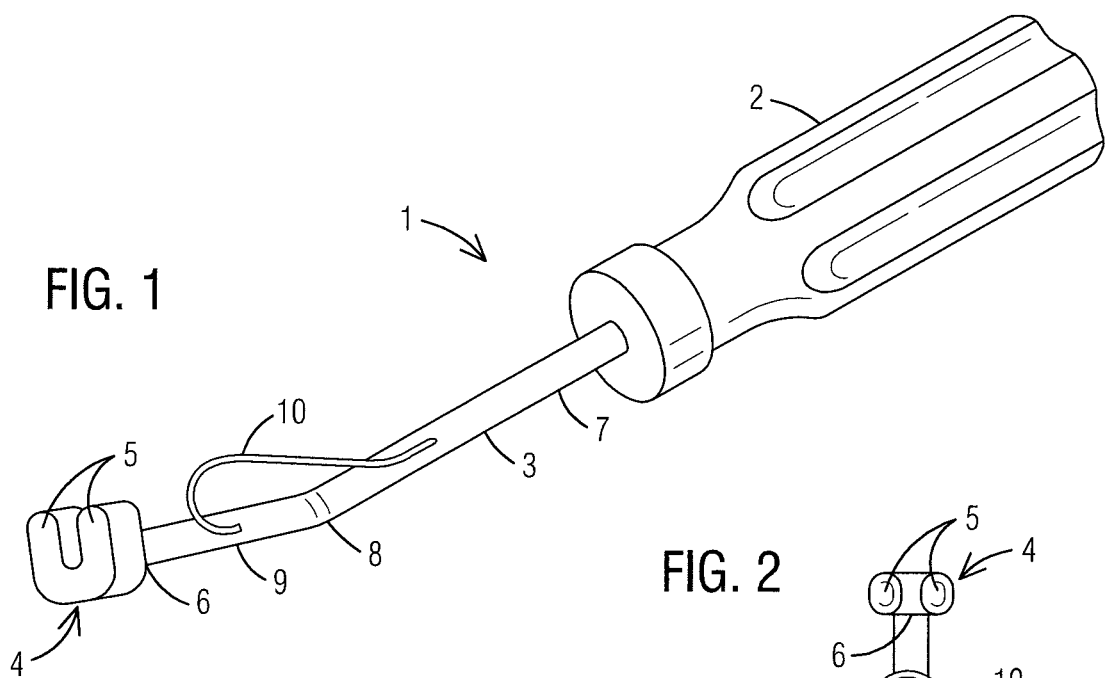
FIG. 1 is a perspective side bottom view of a fish hook removal device of the present invention.
Figure 2:
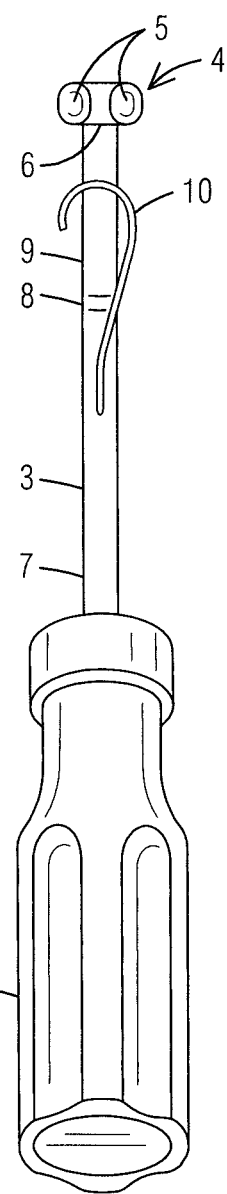
FIG. 2 is a bottom view of a fish hook removal device of the present invention.
Figure 4:
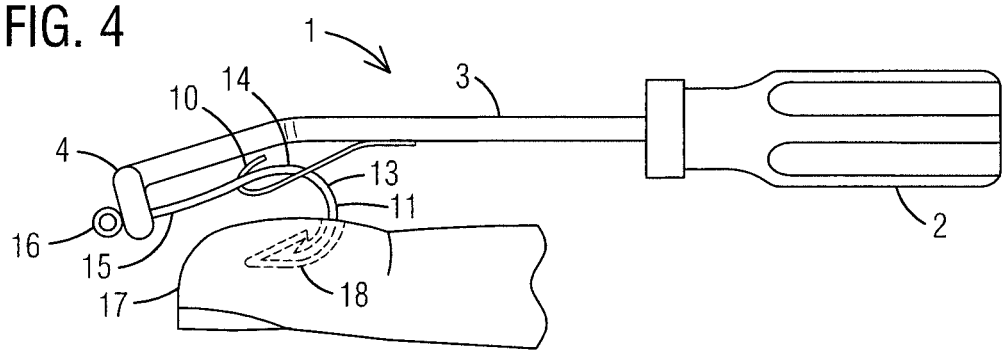
FIG. 4 is a side view of the fish hook removal device of the present invention engaging a fishing hook that has been lodged in a finger.
Figure 5:
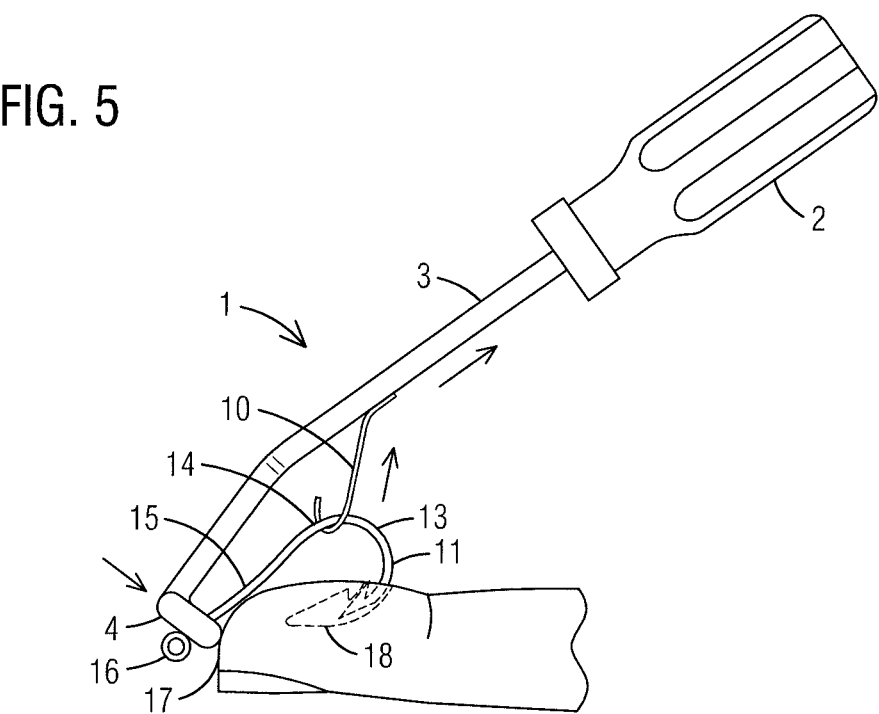
FIG. 5 is a side view of the fish hook removal device of the present invention beginning to remove a fishing hook that has been lodged in a finger.
Figure 6:
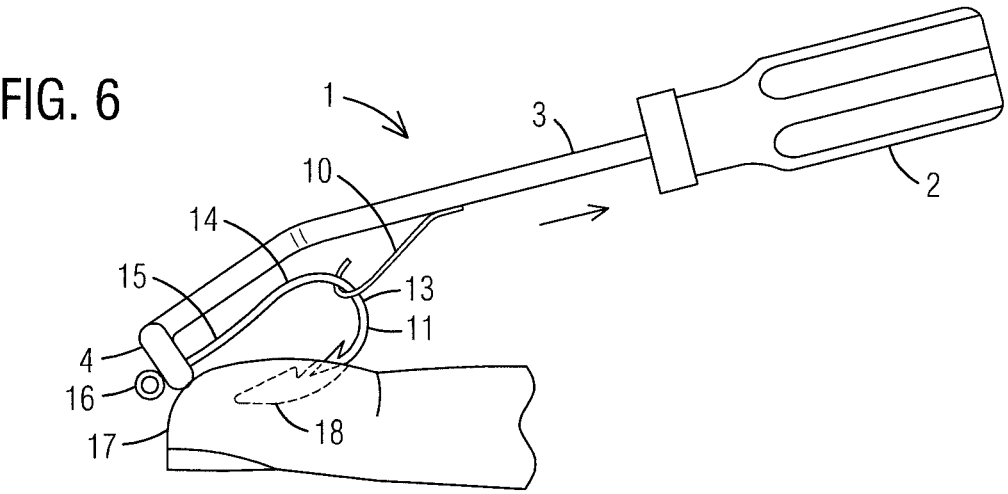
FIG. 6 is a side view of the fish hook removal device of the present invention removing a fishing hook that has been lodged in a finger.

For purposes of describing the preferred embodiment, the terminology used in reference to the numbered accessories in the drawings is as follows:

1. fish hook removal device, generally
2. handle
3. shaft
4. forked tip
5. prong
6. distal end of shaft
7. proximal section of shaft
8. bend
9. distal section of shaft
10. removal hook
11. fishing hook
12. barb
13. curve
14. throat
15. shank
16. eye
17. finger
18. wound With reference to FIGS. 1 and 2, a perspective side bottom view and a top view, respectively, of a fish hook removal device 1 of the present invention are illustrated. The fish hook removal device 1 comprises a preferably cylindrically-shaped handle 2 having an elongated shaft 3 extending therefrom. A forked tip 4 of the elongated shaft 3 is preferably formed from two rounded prongs 5 extending perpendicularly from a distal end 6 of the elongated shaft 3 and being spaced apart to accept a shank 15 of a fishing hook 11 between the two rounded prongs 5, as illustrated in FIGS. 4-6.

The elongated shaft 3 is preferably angled wherein a proximal section 7 extends from the handle 2 in a direction that is parallel to the handle 2 and terminates at a bend 8 where a distal section 9 extends laterally from the proximal section 7 at an angle and terminates at the distal end 6 of the elongated shaft 3.

A removal hook 10 extends from the elongated shaft 3 preferably from the proximal section 7 adjacent to the bend 8. The removal hook 10 preferably extends at an angle from the proximal section 7 toward the general direction of the distal end 6 of the elongated shaft 3 and curves to form a substantially C-shaped hook.

Figure 3:
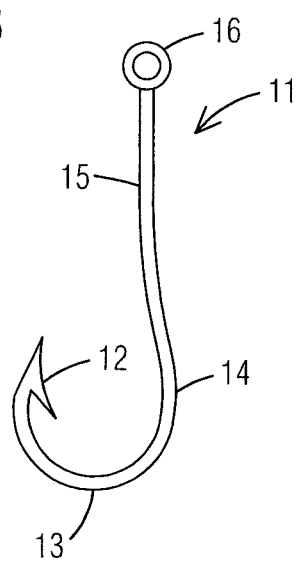
FIG. 3 is a side view of a conventional fishing hook.

With reference to FIG. 3, a side view of a conventional fishing hook is illustrated. The fish hook removal device 1 of the present invention is generally used to remove a conventional fishing hook 11 having a barb 12, curve 13, throat 14, shank 15, and an eye 16 used for attaching the hook 11 to fishing line.

With reference to FIGS. 4-6, a fish hook removal device in different stages of use wherein a fishing hook 11 implanted in a patient's finger 17 being removed is illustrated. As illustrated in FIG. 4, the removal hook 10 extends laterally from the proximal section 7 adjacent to the bend 8 of the fish hook removal device 1 and is placed around the curve 13 and/or throat 14 of the fishing hook 11. The forked tip 4 of the elongated shaft 3 is preferably formed from two rounded prongs 5 extending perpendicularly from the distal end 6 of the elongated shaft 3 and being spaced apart to accept the shank 15 of the fishing hook 11 between the two rounded prongs 5. The forked tip 4 rests against the eye 16 of the fishing hook 11, which locks the forked tip 4 on the shank 15.

As illustrated in FIG. 5, the forked tip 4 is pressed downward against the shank 15 and eye 16 thereby pressing the eye 16 into the patient's finger 17 while the removal hook 10 is pivoted upward like a lever to engage the curve 13 and/or throat 14 of the fishing hook 11. Then, while the forked tip 4 is maintained, the fish hook removal device 1 and fishing hook 11 are pulled in a rearward direction toward the handle 2, as illustrated in FIG. 6. The rearward motion combined with the upward pulling or lever action causes the barb 12 to be pushed into a position wherein the barb 12 is aligned with the original entry point and wound 18, thereby allowing the barb 12 to be easily removed without additional tissue damage.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A fish hook removal device comprising:
   a handle having an elongated shaft extending therefrom;
   said elongated shaft having a distal end with a forked tip located thereon;
   said forked tip having two prongs spaced apart and having a closed end and an open end thereby forming a U-shape capable of accepting and holding a shank of a fishing hook;
   said elongated shaft having a straight proximal section and a straight distal section, wherein an angled bend in said elongated shaft is both between and connects said straight proximal section and said straight distal section;
   said proximal section of the elongated shaft being parallel to said handle;
   said proximal section of said elongated shaft being located between the handle and the distal section of the elongated shaft; and
   a C-shaped removal hook having a proximal end section, a distal end section, and an intermediate section therebetween, said C-shaped removal hook extending from the proximal section of the elongated shaft, wherein said proximal end section of the C-shaped hook is attached in an abutting manner with the proximal section of the elongated shaft so as to be parallel to the proximal section of the elongated shaft, said intermediate section extends from the proximal end section of the C-shaped hook and past the angled bend in said elongated shaft toward the distal section of the elongated shaft, and said distal end section of the C-shaped hook then extends along said distal section of the elongated shaft.

* * * * *